US005365024A

United States Patent [19]

Hasegawa et al.

[11] Patent Number: 5,365,024

[45] Date of Patent: Nov. 15, 1994

[54] ACOUSTIC LENS SYSTEM

[75] Inventors: Akira Hasegawa, Mitaka; Masayoshi Omura; Shinichi Imade, both of Iruma; Eishi Ikuta, Sagamihara, all of Japan

[73] Assignee: Olympus Optical Co., Ltd., Tokyo, Japan

[21] Appl. No.: 15,303

[22] Filed: Feb. 9, 1993

Related U.S. Application Data

[63] Continuation of Ser. No. 501,726, Mar. 30, 1990, abandoned.

[30] Foreign Application Priority Data

Mar. 31, 1989 [JP] Japan .................................. 1-081898

[51] Int. Cl.[5] ........................ G10K 11/00; G01S 15/00

[52] U.S. Cl. .................................... 181/176; 367/103; 367/150

[58] Field of Search ................ 181/176; 367/150, 103, 367/104; 73/642; 350/418

[56] References Cited

U.S. PATENT DOCUMENTS 2,684,725 7/1954 Kock .................................. 181/176
2,819,771 1/1958 Kock .................................. 181/176
3,618,696 11/1971 Hurwitz ............................ 73/642 X
3,620,326 11/1971 Hogge ................................ 181/176
3,687,219 8/1972 Langlois ............................. 181/176
3,979,711 9/1976 Maginness et al. ............ 367/150 X
4,001,766 1/1977 Hurwitz ............................ 73/642 X
4,131,025 12/1978 Mezrich et al. .................. 73/642 X
4,387,599 6/1983 Samodovitz .................... 181/176 X
4,911,538 3/1990 Robb .................................. 350/418

FOREIGN PATENT DOCUMENTS 51-113601 10/1976 Japan .

OTHER PUBLICATIONS

Beaver, et al., "Ultrasonic Imaging with an Acoustic Lens", IEEE Transactions on Ultrasonics, vol. SU-24, No. 4, Jul. 1977, pp. 235-243.

*Primary Examiner*—Michael L. Gellner
*Assistant Examiner*—Jae N. Noh
*Attorney, Agent, or Firm*—Cushman, Darby & Cushman

[57] ABSTRACT

The acoustic lens system is used for ultrasonic imaging in an ultrasonic system which displays an image of an object while transmitting ultrasonic waves and receiving the ultrasonic waves reflected from the object, and has a half field angle ω expressed as follows:

$$\omega < \sin^{-1}\left(\frac{v_0}{v_1}\right)$$

wherein the reference symbol $v_0$ represents the velocity of sound in the medium located on the incidence side of the first lens surface and the reference symbol $v_1$ designates the velocity of sound in the medium located on the emergence side of the first lens surface. Accordingly, the acoustic lens system according to the present invention is remarkably excellent in the performance thereof in respect of field angles, aberrations, aperture angles, attenuation, etc., and has an advantage to permits further reducing acoustic attenuation and preventing spurious images from being formed due to multiple reflections by arranging antireflection films on the lens surfaces.

17 Claims, 15 Drawing Sheets

FIG. 19
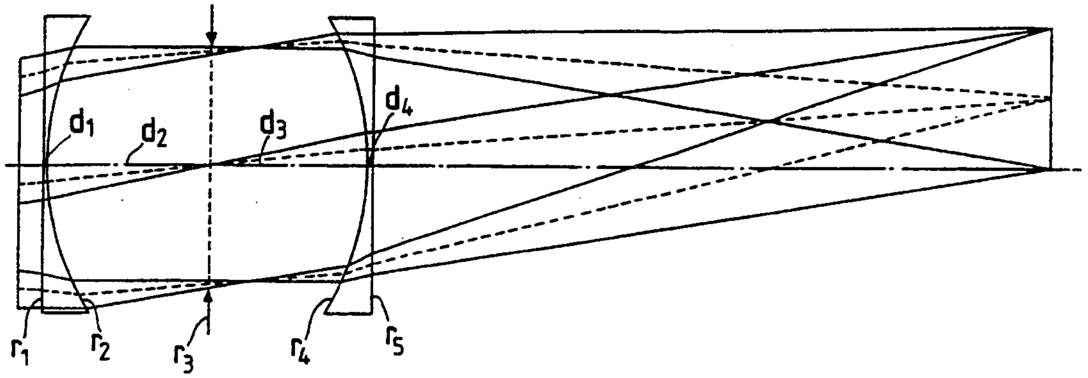
FIG. 20A
FIG. 20B
FIG. 20C
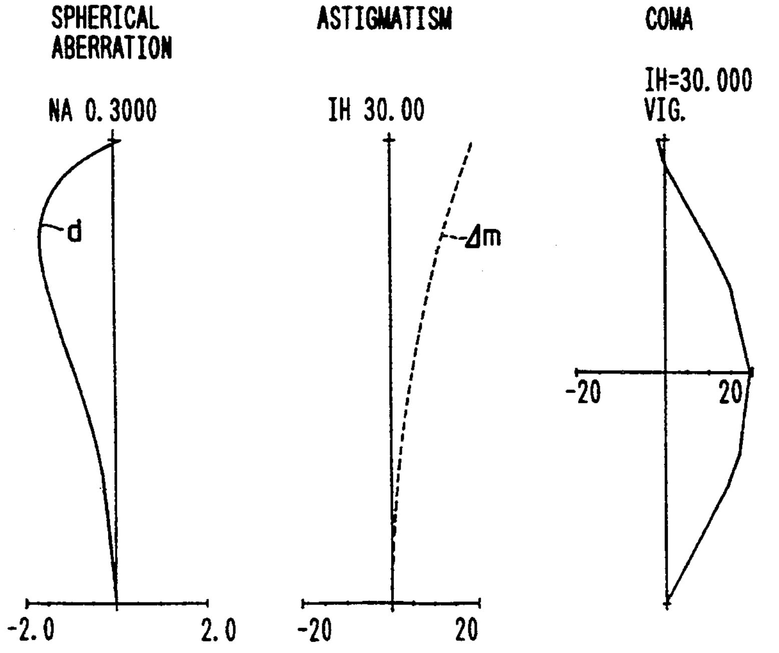

FIG. 21
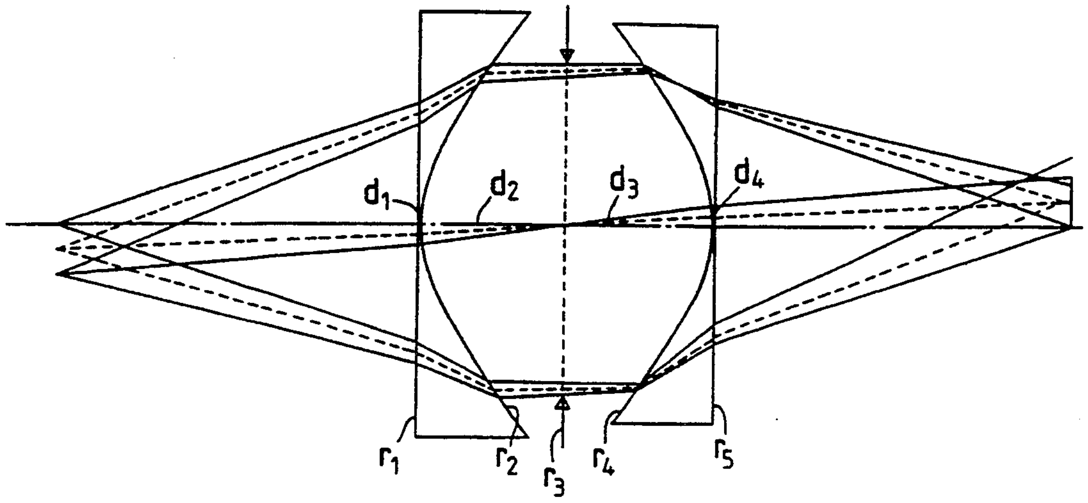
FIG. 22A
FIG. 22B
FIG. 22C
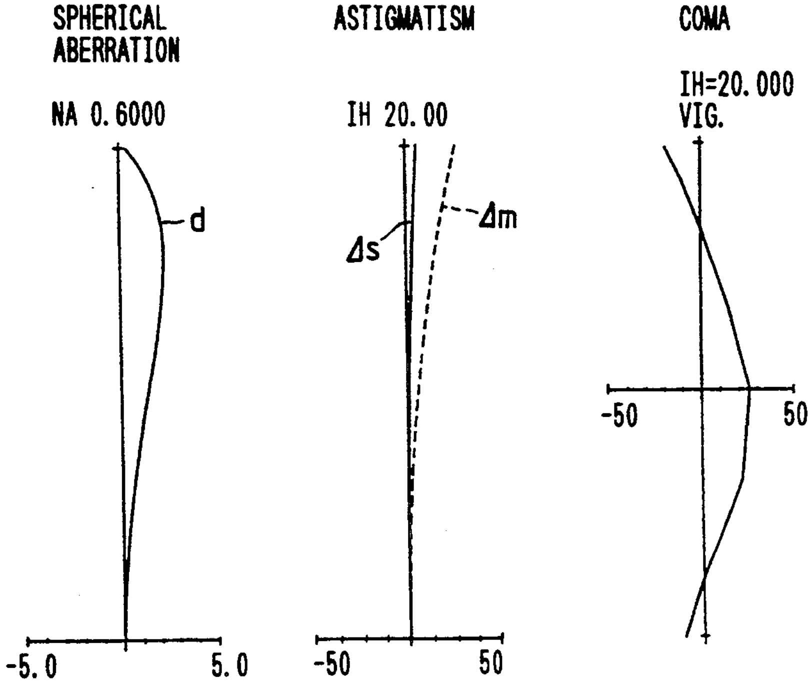

FIG. 25
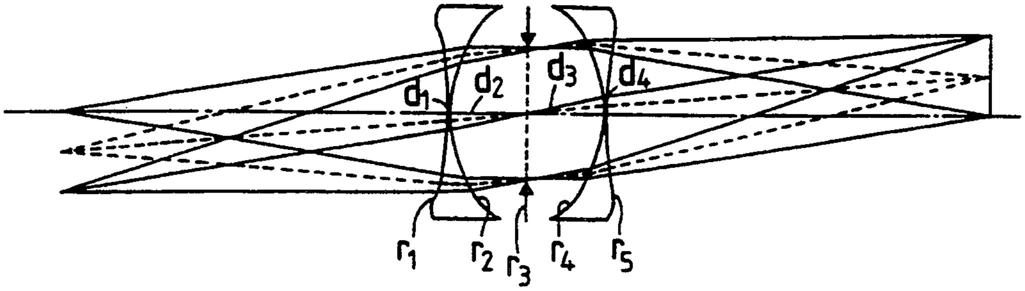
FIG. 26A
FIG. 26B
FIG. 26C
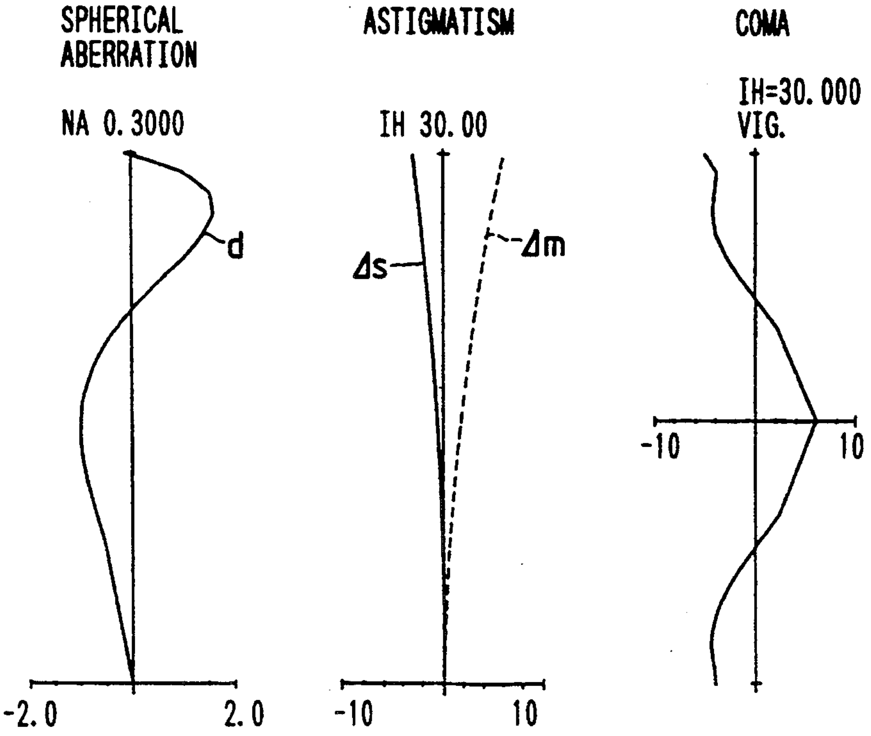

FIG. 27
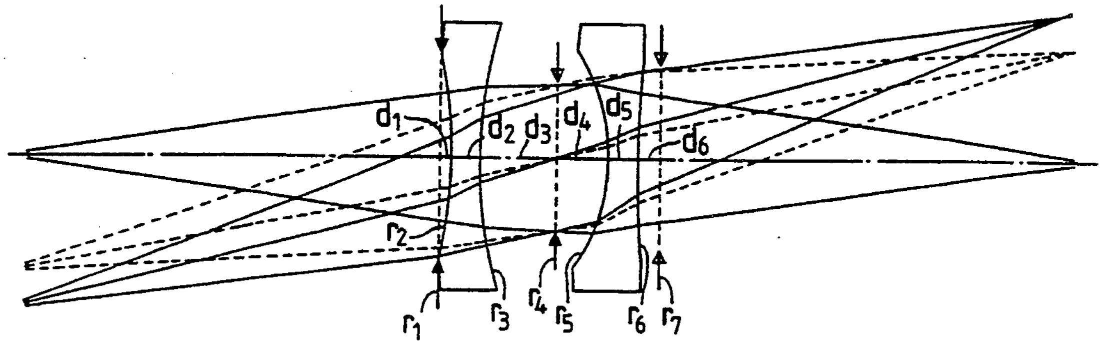
FIG. 28A
FIG. 28B
FIG. 28C
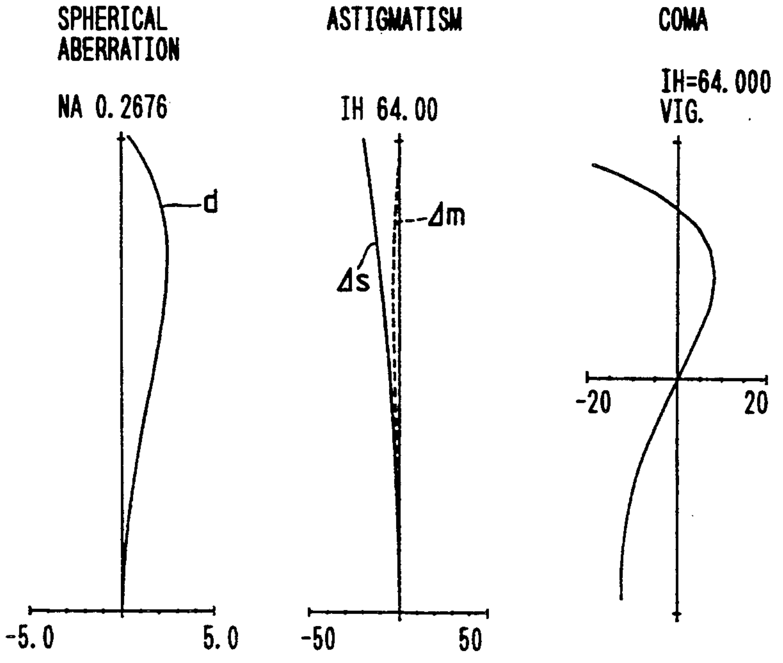

FIG. 29
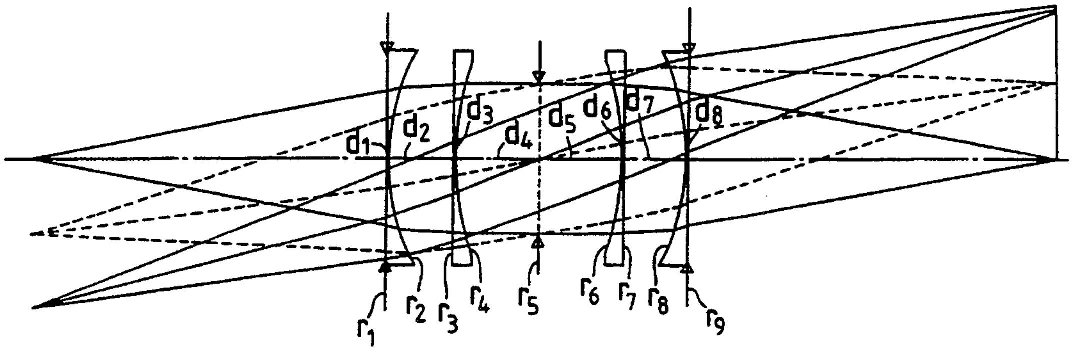
FIG. 30A
FIG. 30B
FIG. 30C
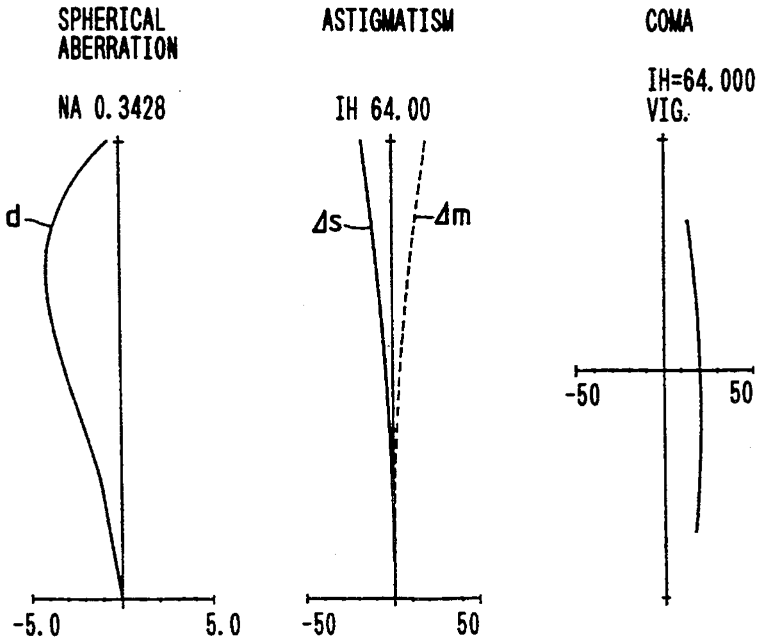

FIG. 31
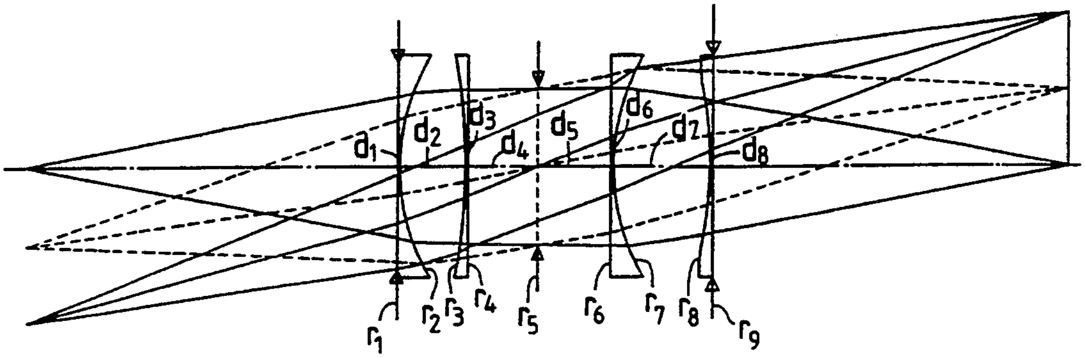
FIG. 32A
FIG. 32B
FIG. 32C
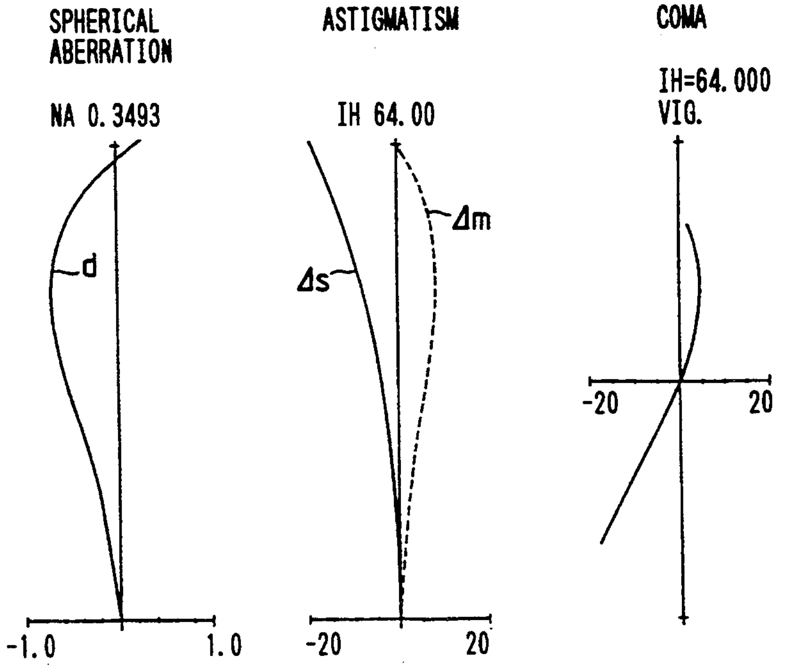

ACOUSTIC LENS SYSTEM

This is a continuation of application Ser. No. 07/501,726 filed Mar. 30, 1990, now abandoned.

BACKGROUND OF THE INVENTION a) Field of the Invention

The present invention relates to an acoustic lens system to be used for ultrasonic imaging in an ultrasonic system which displays an ultrasonic image of an object while transmitting ultrasonic waves and receiving the ultrasonic waves reflected by the object.

b) Description of the Prior Art

An ultrasonic system of this type comprises, as shown in FIG. 1, a transducer 1 which is composed of an array of minute ultrasonic elements arranged in a pattern of lattice, and an acoustic lens system 2 which is made of polystyrene or a similar material and located between the transducer and the object. Each of the ultrasonic elements is so adapted as to transmit ultrasonic waves under excitation by a pulse generator 3 and receive the ultrasonic waves reflected by the object (the ultrasonic element serves as a transmitter and also as a receiver). The spaces reserved between the transducer 1 and the acoustic lens system 2 and between the acoustic lens system 2 and the object are filled with water or the similar substance.

First, one of the ultrasonic elements transmits ultrasonic pulses, which are focused on the object by the acoustic lens system 2. The ultrasonic pulses reflected by the object are focused reversely on an original ultrasonic element by the acoustic lens system 2 and transduced into electrical signals by the ultrasonic element. Then, the neighboring ultrasonic element functions in a similar manner. Upon completing the scanning of one line after the repetition of the similar manner, the scanning proceeds to the next line. By operating all the ultrasonic elements as described above, an entire range covering the object is scanned by the ultrasonic waves. The electrical signals thus obtained are processed by a signal processing circuit 4 for displaying an ultrasonic image of the object on a monitor TV 5.

The conventional acoustic lens systems of the type described above have already been disclosed, for example, by Japanese Patent Preliminary Publication No. Sho 51-113601 and U.S. Pat. No. 3,979,711.

However, in these documents, as the acoustic lens systems of the above-described type, biconcave single lenses made of substances having the velocity of sound of the inside higher than that of water are merely illustrated and detailed analyses are not made as to conditions required to secure the acoustic lens systems suitable for the above system. As a result, clarification is not made as to how the acoustic lens systems which have wide field angles and good resolution, can be acquired and neither are the acoustic lens systems having imaging performance sufficient for practical use realized. Further, the conventional acoustic lens systems adopt no antireflection films and therefore allow reflection to be caused due to difference in acoustic impedance, thereby posing a problem that ultrasonic waves are remarkably attenuated due to lowering of transmittance therefor. In addition, the conventional acoustic lens systems have another problem that the lens systems allow spurious images, namely ghost, to be formed due to multiple reflections on the lens surfaces.

SUMMARY OF THE INVENTION

In view of the problems described above, it is the object of the present invention to provide an acoustic lens system which has performance remarkably improved in respect of field angles, aberrations, aperture angles, attenuation and so on.

The acoustic lens system according to the present invention, which is to be used for ultrasonic imaging in an ultrasonic system for displaying an ultrasonic image of an object while transmitting an ultrasonic wave and receiving the ultrasonic wave reflected by the object, is characterized in that a half field angle $\omega$ of the acoustic lens system is expressed by $$\omega < \sin^{-1}\left(\frac{v_0}{v_1}\right)$$

wherein the reference symbol $v_0$ represents the velocity of sound in a medium located on the incidence side of a first lens and the reference symbol $v_1$ designates the velocity of sound in the medium located on the emergence side of the first lens surface.

Now, a description will be made of the half field angle.

FIG. 2 is a schematic sectional view illustrating the principle of refraction. In this drawing, the solid lines with arrows represent envelopes of normals of ultrasonic wave fronts and will hereinafter be referred to as acoustic rays. When the velocity of sound of the ultrasonic wave of a certain frequency in a medium I on the incident side is designated by $v_1$, the velocity of sound of the ultrasonic wave of the same frequency in a medium II on the emergence side is denoted by $v_2$, the angle of incidence of the ultrasonic wave on an interface (namely, an angle made by the normal to the interface with the acoustic ray in the medium on the incident side) is represented by $\theta_1$ and the angle of refraction (namely, an angle made by the normal to the interface with the acoustic ray in the medium on the emergence side) is designated by $\theta_2$, the well-known relationship is established that $$\sin\theta_1/\sin\theta_2 = \frac{v_1}{v_2} \quad (1)$$

Accordingly, $v_1/v_2$ is regarded as the relative refractive index of both the media and when the refractive index of the medium I is taken as $n_1$ and that of the medium II as $n_2$, the formula (1) can be transformed as follows:

$$\sin\theta_1/\sin\theta_2 = \frac{v_1}{v_2} = \frac{n_2}{n_1} \quad (2)$$

Also in this case, the refractive indices $n_1$, $n_2$ of the media are defined so that the velocity of sound in water is assumed to be 1 (one).

FIG. 3 is a view showing acoustic rays forming an image of the object with a certain size, that is, relative to the acoustic lens system with the field angle and the image formation, to provide the notation which will be described below. FIG. 4 is an enlarged view showing a portion adjacent to a first surface of the acoustic lens system. In these figures, the reference numeral 11 represents an acoustic lens system having the first surface of a radius of curvature $R_1$ and a second surface of a radius of curvature $R_2$, 12 an object, and 12' an image of the object 12 formed by the acoustic lens system 11 . Further, the reference numeral 14 designates an acoustic beam stop limiting the aperture of the acoustic lens system. An angle made by an axial marginal acoustic ray (namely, an acoustic ray emanating from an axial object point to traverse the outermost side of the aperture of the acoustic lens) A with the axis of the lens is taken as $\theta$, an angle made by an off-axial principal acoustic ray (namely, an acoustic ray emanating from an off-axial object point to pass through the center of the acoustic beam stop) 15 of the maximum image height with the axis, that is, a field angle, as $\omega$, an angle made by an off-axial marginal acoustic ray (namely, an acoustic ray emanating from the off-axial object point to traverse the outermost side of the aperture of the acoustic lens) 13 with the off-axial principal acoustic ray 15 as $\phi$, a height of incidence of the off-axial principal acoustic ray 15 on the first surface as $h_1$, a distance between the object 12 and the apex of the first surface as s, a distance between the apex of the second surface and the image 12' as s', an axial thickness of the lens as d, and a distance between the first surface and the entrance pupil as EP.

As practical lens media, substances listed in the following table are currently available.

TABLE

| | Medium | | | | |
|---|---|---|---|---|---|
| | Water | Polystyrene 550 | TPX004 | TPX002 | Substance having a velocity of sound of 1000 m/s |
| Velocity of sound v [m/s] | 1524 | 2276 | 2013 | 1940 | 1000 |
| Refractive index $n = \frac{v_w}{v}$ taking refractive index of water as standard | 1 | 0.6696 | 0.7571 | 0.7856 | 1.524 |
| Refractive index $n = \frac{3000}{v}$ taking refractive index of a medium having velocity of sound v = 300 m/s | 1.9685 | 1.3181 | 1.4903 | 1.5464 | 3.0 |
| Acoustic impedance [$kg/m^2 \cdot s$] | $1.524 \times 10^6$ | $2.39 \times 10^6$ | $1.68 \times 10^6$ | $1.62 \times 10^6$ | |
| Reflectance on interface with water: $r = \left\lvert \frac{Z_2 - Z_1}{Z_2 + Z_1} \right\rvert$ | 0 | 0.22 | 0.05 | 0.03 | |

In the table shown above, values of the velocities of sound are defined as those of an ultrasonic wave having a frequency of 5 MHz and measured at a temperature of 37° C. Further, the reference symbol $V_w$ represents the velocity of sound in water, the reference symbol $Z_1$ designates the acoustic impedance of water and the reference symbol $Z_2$ denotes the acoustic impedance of a lens medium.

It is general to use a substance having velocity of sound higher than that of water as a lens medium, and water or a substance having the velocity of sound close to that of water is used as a medium surrounding the lens from the viewpoints of the attenuation property, etc. Accordingly, total reflection is apt to be caused on the lens surface since an ultrasonic wave is incident from water (generally having a higher refractive index) on the lens medium (usually having a lower refractive index). When polystyrene is used as a lens medium, for example, an critical angle of the total reflection is:

$$\sin^{-1}\left(\frac{1514}{2276}\right) = 42.04°$$

This critical angle imposes a strict restriction to an acoustic lens system having a certain field angle. For example, in FIG. 3, an ultrasonic wave travelling from the off-axial object point in the direction indicated by the marginal acoustic ray 13 is totally reflected with high possibility and, when the acoustic beam to be imaged is thinned by the total reflection, diffraction is caused, thereby degrading resolution at the marginal portion of the image surface. It is therefore required to focus, without total reflection, at least half the acoustic beam which is reflected from the object point corresponding to the maximum image height (namely, the object point located at a position farthest from the axis of the an acoustic lens), apt to be subjected to remarkable loss due to the total reflection and not eclipsed by the acoustic beam stop. For this purpose, when the velocity of sound in the lens medium is denoted by $V_0$ and the velocity of sound in the medium outside the lens system is represented by $V_1$, the requiste is that an angle of incidence $\omega'$ of the off-axial principal acoustic ray 15 on the first surface of the lens system is smaller than the critical angle $$\sin^{-1}\left(\frac{v_0}{v_1}\right)$$

as expressed by $$\omega' < \sin^{-1}\left(\frac{v_0}{v_1}\right) \qquad (3)$$

Hence, the absolute requirement is the following relation between the maximum field angle $\omega$ and the ratio between the velocities of sound:

$$\omega + \sin^{-1}\left(\frac{h_1}{R_1}\right) < \sin^{-1}\left(\frac{v_0}{v_1}\right) \tag{4}$$

wherein the reference symbol $h_1$ represents the height of incidence of the principal acoustic ray on the first lens surface at the maximum field angle and the reference symbol $R_1$ designates the radius of curvature of the first lens surface. In a case where $h_1 << R_1$, the second term on the left side of the formula (4) is negligible and the absolute requirement is expressed as:

$$\omega < \sin^{-1}\left(\frac{v_0}{v_1}\right) \tag{5}$$

when these requirements are satisfied, the ray which is upper or lower than the principal acoustic ray, out of the rays reflected from the same object point, is incident on the first lens surface at an angle smaller than the angle of incidence of the principal ray, and at least half of the acoustic beam will be transmitted through the acoustic lens system without being totally reflected, depending on convergent or divergent condition of the acoustic beam.

Now, discussion will be made on an acoustic lens system of a thin type which can prevent total reflection and is composed of a small number of lens elements.

Comparison will be made between an acoustic lens system of a type having the surfaces which have powers on both sides of the stop 14 and are convex toward the stop 14 respectively as shown in FIG. 3 or FIG. 5, and an imaging lens system of another type having the surfaces which are arranged on both sides of the stop 14 and are concave toward the stop 14 as illustrated in FIG. 6. The acoustic lens system shown in FIG. 5 is obtained simply by leaving portions adjacent to the first and second surfaces and replacing a central portion with water in the acoustic lens system illustrated in FIG. 3. The above-mentioned formula (4) is the requirement for the type shown in FIG. 3 or FIG. 5, whereas the above-mentioned formula (5) constitutes the requirement for the type illustrated in FIG. 6. Since the formula (5) does not comprise the second term in the left side of the formula (4), it will be understood that the type shown in FIG. 6 is free from the influences due to the radius of curvature on the first lens surface or the height $h_1$ of the incident acoustic ray on the first lens surface, and is more advantageous. In the above-mentioned formulae (4) and (5), only the principal acoustic ray is taken into consideration. In order to obtain acoustic beams of the similar amounts both at the central portion and the marginal portion of the image surface by preventing total reflection of the marginal acoustic rays, for example, the acoustic ray 13 shown in FIG. 3, it is necessary to compose the imaging lens system 11 of a medium having the velocity of sound which can satisfy the following relationship so as to prevent total reflection of the acoustic ray 16 shown in FIG. 6:

$$\omega + \phi < \sin^{-1}\left(\frac{v_0}{v_1}\right) \tag{6}$$

wherein the reference symbol $\phi$ represents the divergent angle of the acoustic beam.

In contrast to the type shown in FIG. 6 advantageous for imaging the off-axial acoustic beam, the type shown in FIG. 3 is more advantageous for imaging the axial acoustic beam and can increase the numerical aperture. Speaking concretely, the type shown in FIG. 3 provides a smaller angle of incidence on the refracting surface with respect to the acoustic ray of the divergent angle $\theta$ than that of the type shown in FIG. 6. This is obvious from the fact that the first lens surface is concave on the object side in the acoustic lens system of the type shown in FIG. 3.

In the acoustic lens system of the type shown in FIG. 6, in contrast, the axial acoustic beam is restricted as expressed below:

$$\theta < \sin^{-1}\left(\frac{v_0}{v_1}\right) \tag{7}$$

Though nearly no description is made above on function of the acoustic beam stop, it is greatly effective, not only for correction of aberrations but also forelimination of noise produced due to irregular reflection, etc. of ultrasonic rays, to arrange the acoustic beam stop 14 functioning to restrict the axial and off-axial acoustic rays, since the correction of aberrations is facilitated when the thickness of the acoustic beam is adequately thinned by selecting an aperture of an acoustic stop having a size smaller than an outside diameter of the imaging lens.

Further, an ultrasonic lens having a large numerical aperture especially for the off-axial acoustic rays is apt to allow total reflection, which will allow the totally reflected acoustic rays to be detected as noise on the side of the detecting ultrasonic elements (on the side of the imaging surface). It is therefore desirable to preliminarily cut off the acoustic rays to be totally reflected by using an ultrasonic absorbing material made of a substance capable of preventing reflection.

Furthermore, in the case of an ordinary lens surface, apart from the total reflection, a small amount of reflected waves is produced and constitutes a cause of noise. Accordingly, it is very effective for reducing noise to cover the sides of the acoustic lens system 11 with an ultrasonic absorbing material 18 as shown in FIG. 7. Further, it is also effective for the reduction of noise to dispose, at a proper position of the lens system, a stop for preventing an acoustic beam traveling out of a regular course due to the reflection by the lens surface from reaching the imaging surface (such a stop will be referred to as a stray acoustic beam stop), apart from the acoustic beam stop for restricting the numerical aperture of the lens system.

Now, a description will be given of the thickness of the lens. The thinner lens is more preferable since ultrasonic waves are generally attenuated very remarkably in the medium of the acoustic lens. From the view point of the attenuation characteristic, the acoustic lens system which is composed of two lens elements with no lens medium interposed therebetween as shown in FIG.

5 is more excellent than the acoustic lens system illustrated in FIG. 3. Attenuation of the ultrasonic beam will be discussed below on a concrete example.

Comparison will be made between the single-element lens shown in FIG. 3 and the lens system illustrated in FIG. 5 wherein the same lens is cut along two planes, and the intermediate section is removed and replace with water. Let us assume that d=20 mm in FIG. 3, that $d_1=d_2=5$ mm and the space reserved between the two lens elements=10 mm, and that the lens elements are made of polystyrene and dipped in water. Let us furtherassume that D represents an acoustic path length expressed in terms of polystyrene (a distance measured along the path of an acoustic ray will hereinafter be referred to as an acoustic path length). Then, the lens system shown FIG. 5 has the following acoustic path:

$$D=10+10/0.6696=24.93$$

Accordingly, the optical path length as measured from the first surface to the final surface of the lens system shown in FIG. 5 is greater than that of the lens illustrated in FIG. 3. However, attenuation of the ultrasonic beam in water is negligible as compared with that in polystyrene and the lens system shown in FIG. 5 which has a little greater acoustic path length is more advantageous than the lens illustrated in FIG. 3 from the viewpoint of the attenuation characteristic.

When ultrasonic attenuation rate in polystyrene is taken as −0.25 dB/mm, transmittance for the axial ray is approximately 32% and that for the axial ray is approximately 56% in FIG. 5. Accordingly, it is possible to enhance the amount of the transmitted acoustic beam approximately 75% by reducing the thickness of the polystyrene medium to ½ as illustrated in FIG. 5. Though the enhancing effect is variable dependently on materials of lenses, can be enhanced approximately on the order of 50% by reducing thickness of lenses to ½ or so. It is therefore preferable to design an acoustic lens system so as to satisfy the following relationship:

$$\frac{D}{2} > \sum_{m=1}^{n} dm \qquad (8)$$

wherein the reference symbol D represents total length of the acoustic lens system, and the reference symbols $d_1, d_2, \ldots d_n$ designate thickness of the lens elements as measured on the optical axis (the reference symbol n denotes the number of lens elements).

Though the ultrasonic attenuation has been discussed only in the vicinity of the axis of the lens system in the above example,transmittance is generally further lowered at the marginal portion at which the lens system is thicker.

FIG. 8 and FIG. 9 illustrate models wherein a radius of curvature $R_1=R_2=30$ mm is selected for the lens surfaces shown in FIG. 3 and FIG. 5, respectively. When an object point 0 is set at a location where the axial acoustic ray becomes parallel with the axis, an ultrasonic source is placed at the object point 0 and the height of the acoustic ray at a location of a stop 14 is represented by h, the relations illustrated in FIG. 10 are obtained taking h and transmittance of the lenses as the abscissa and the ordinate, respectively. As is clear from this drawing, transmittance is lowered as the acoustic ray becomes higher and it is effective to reduce thickness of the lenses especially for lens systems having large numerical apertures or lens systems having wide field angles. In addition, a lens system may be composed of four or more lens elements as illustrated in FIG. 11A or FIG. 11B.

Further, in a case where one ultrasonic image pickup device is used for both transmission and reception of ultrasonic pulses, it is desired to further reduce the thickness of the lens system since the ultrasonic pulses travel twice through this lens system.

Furthermore, it is very important to coat the lens surfaces with antireflection films not only in the lens shown in FIG. 3 but also in the lens systems illustrated in FIGS. 5, 6, 7, 11A and 11B.

The antireflection film is also referred to as a matching layer. When polystyrene is selected as a lens medium and the matching layer is used as soft polyethylene which is different from the lens medium, the thickness of the matching later to an ultrasonic wave of 5 MHz reaches a layer as thick as approximately 0.1 mm and makes it very difficult to be coated uniformly on curved surfaces. For this reason, it is desirable that the radii of curvature are large to such an extent as is possible and it is more advantageous that all surfaces of plural lenses are provided with the curvature as in the lens system of FIG. 7 and a large number of lenses is disposed as in FIGS. 11A and 11B because the curvature of each lens surface can be moderated.

FIG. 12 is a sectional view illustrating an acoustic lens system having antireflection films coated on the lens surfaces. In this drawing, the surfaces of the acoustic lens system 11 are coated with antireflection films 19, 20 and 21, each of which is formed as a single layer or plural layers, and are dipped in water 22. A plastic material such as polystyrene is used as the lens medium. Let us assume that the antireflection films are λ/4 thick each, and have acoustic impedance values of $Z_1$, $Z_2$ and $Z_3$ respectively. The reference numeral λ represents the wavelength at the central frequency of an ultrasonic beam. When the acoustic impedance of the lens system 11 is represented by $Z_L$ and the acoustic impedance of water 22 is designated by $Z_w$, the following relationship establishes among these acoustic impedance values:

$$Z_1 = \sqrt{Z_w \cdot Z_c}$$

$$Z_1 = \sqrt[4]{Z_w \cdot Z_L^3}$$

$$Z_2 = \sqrt[4]{Z_w^3 \cdot Z_L}$$

$$Z_1/Z_L = \sqrt[8]{Z_w/Z_L}$$

$$Z_3/Z_L = \sqrt[8]{(Z_w/Z_L)^7}$$

$$Z_2/Z_L = \sqrt[8]{(Z_w/Z_L)^4}$$

Usable as materials of the antireflection films are, polyethlene, polyimide, PVDF, polyester, mixtures of epoxy resins and tungsten, and so on. The antireflection films can be formed by bonding these synthetic resins to the lens surfaces by thermocompression bonding, high-frequency fusing, coating, casting or the similar process.

Though the acoustic impedance is transduced completely from $Z_w$ to $Z_L$ at the frequency at which the thickness of each antireflection film is just equal to λ/4, complete matching becomes impossible or transmittance is lowered as deviated from the frequency. The frequency band assuring high transmittance is widened as the antireflection film is composed of more layers. In the case of an ultrasonic diagnosis instrument, it is necessary to transmit short ultrasonic pulses having a wide frequency band for improving distance resolution (ability to discriminate the difference with an object distance). The resolution can be improved by composing the antireflection film of a plural number of layers so as to widen the frequency band of transmittance of the lens and allow shoter ultrasonic pulses to be transmitted.

Description will be made on a case where polystyrene is selected as a lens medium and a antireflection film is made of a single layer. Since the acoustic impedance of polystyrene is $Z_L=2.39\times10^6$(kg/m²·s) and the acoustic impedance of water is $Z_w=1.524\times10^6$(kg/m²·s), the acoustic impedance of the antireflection film becomes $$Z_1 = \sqrt{2.39 \times 10^6 \times 1.524 \times 10^6} = 1.91 \times 10^6 \text{ (kg/m}^2 \cdot s).$$

When soft polyethylene (density 0.92 (g/cm³), acoustic velocity 2080 (m/s)) is selected as a material for the antireflection film, the acoustic impedance of the antireflection film is $Z_1=1.92\times10^6$(kg/m³·s) and a sheet of the soft polyethylene having thickness equal to ¼ of the wavelength λ of the central frequency of ultrasonic waves should be bonded by thermocompression bonding or with a bonding agent.

This and other objects as well as the features and advantages of the present invention will be apparent from the following detailed description of the preferred embodiments when taken in conjunction with the accompanying drawings.

BRIEF DESCRIPTION OF THE DRAWINGS

FIGS. 13, 15, 17, 19, 21, 23, 25, 27, 29 and 31 are sectional views illustrating compositions of Embodiments 1 through 10, respectively, of the acoustic lens system according to the present invention; and FIGS. 14, 16, 18, 20, 22, 24, 26, 28, 30 and 32 are curves illustrating aberration characteristics of the Embodiments 1 through 10, respectively, of the present invention.

DESCRIPTION OF THE PREFERED EMBODIMENTS

Now, the present invention will be described more detailedly with reference to the preferred embodiments shown in the accompanying drawings and given in the form of the following numerical data. In the numerical data, the reference symbols $r_1$, $r_2$, . . . represent radii of curvature on the surfaces of the respective lens elements, the reference symbols $d_1$, $d_2$, . . . designate airspaces reserved between the respective lens surfaces, the reference symbols $n_1$, $n_2$, . . . denote refractive indices of the respective lens elements, the reference symbol $l_1$ represents the distance as measured from the foremost surface of the lens system to the object point, the reference symbol $l_2$ designates the distance as measured from the rearmost surface of the lens system to the image point, the reference symbol IH denotes image height, the reference symbol f represents the focal length of the lens system, the reference symbol f represents the focal length of the lens system, the reference symbol $P_s$ designate a Petzval's sum, and the reference symbol NA denotes a numerical aperture. Further, an aspherical surface used in each embodiment is expressed by $$x = \frac{\frac{y^2}{R}}{1 + \sqrt{1 - P\frac{y^2}{R^2}}} + B_2y^2 + E_4y^4 + \ldots$$

wherein an axis of a lens system (the straight line passing through the centers of curvature on the respective surfaces) is taken as the x axis,a straight line perpendicular to the axis of the lens system is taken as the y axis, the intersection between the x axis and the surface is taken as the origin, the reference symbol R represents the radius of curvature on the surface at the origin, the reference symbol P designates the coefficient of cone, and the reference symbols $B_2$, $E_4$, . . . denote the aspherical surface coefficients of the second order, the fourth order, . . .

Embodiment 1

Figure 1:
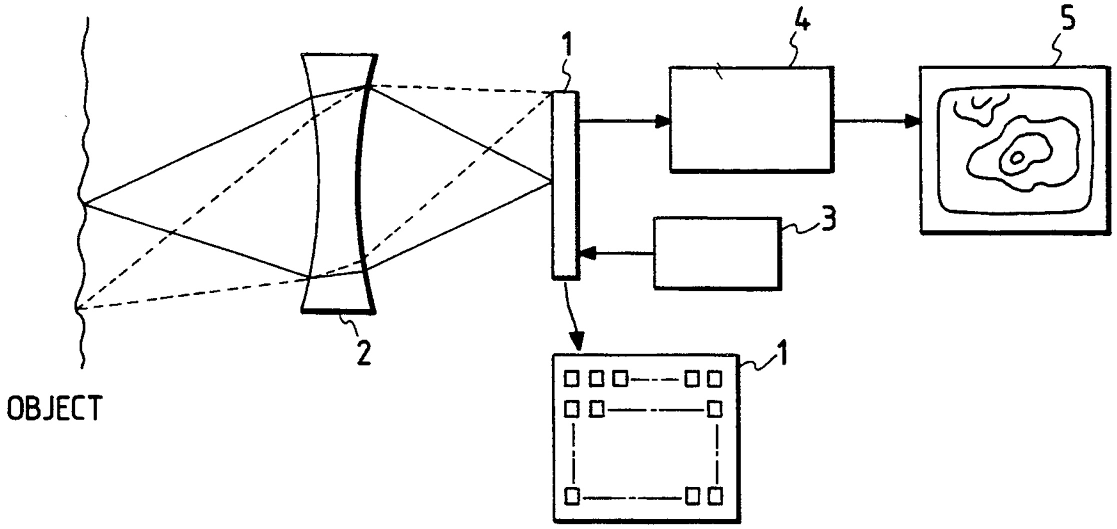
FIG. 1 PRIOR ART
FIG. 1 is a schematic block diagram illustrating the conventional ultrasonic system.
Figure 2:
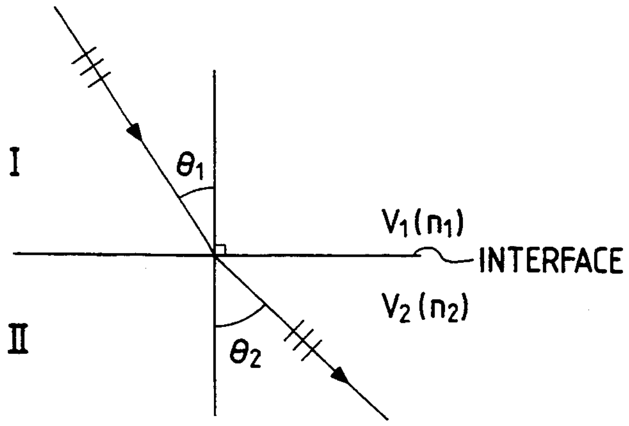
FIG. 2 is a sectional view descriptive of the principle of ultrasonic refraction.
Figure 3:
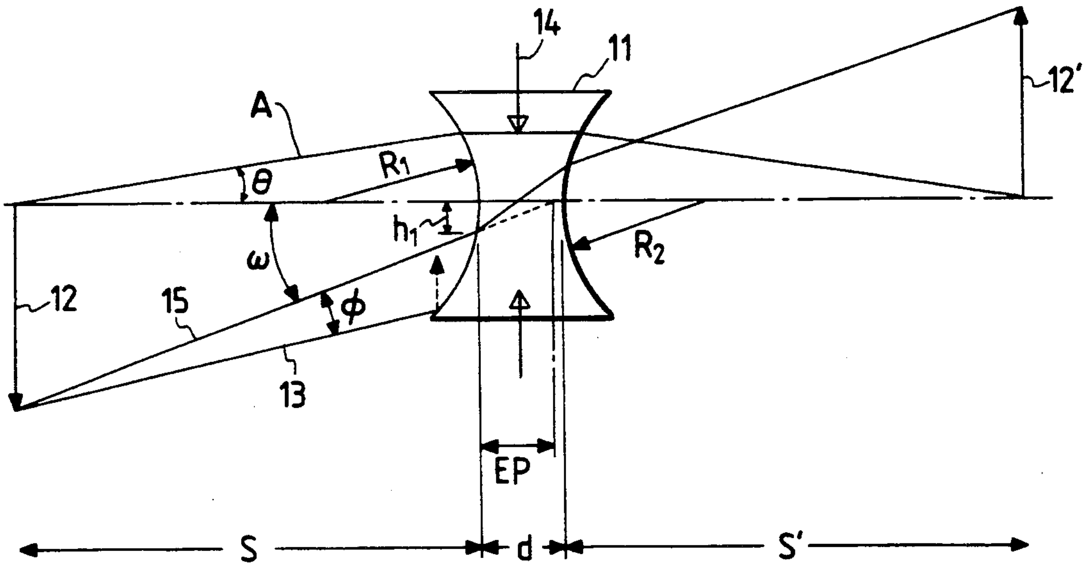
FIG. 3 is a sectional view illustrating a typical example of the acoustic lens system according to the present invention.
Figure 4:
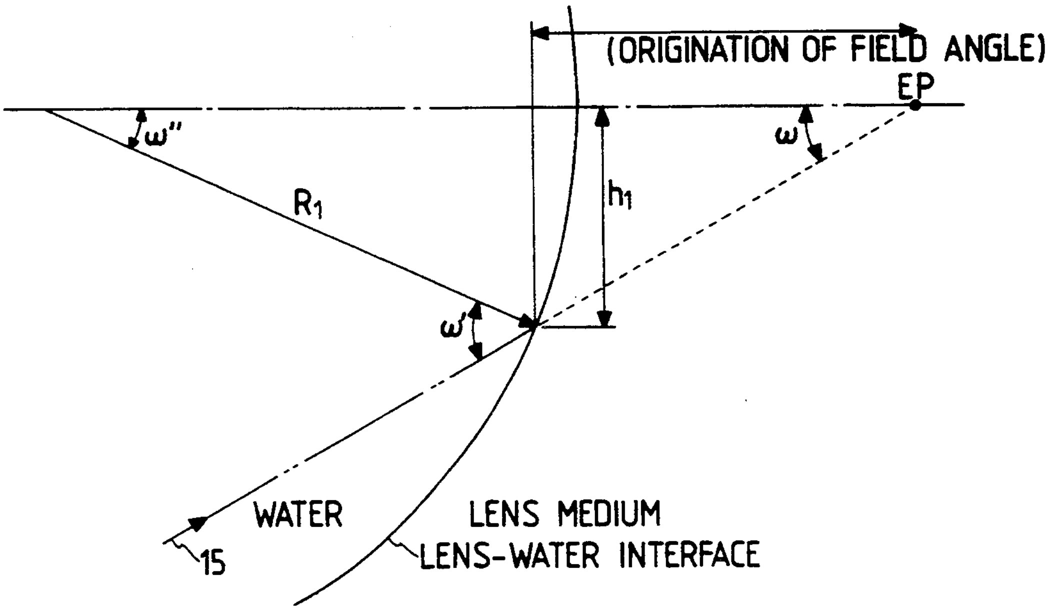
FIG. 4 is a diagram descriptive of prevention of total reflection on a lens-water interface.
Figure 5:
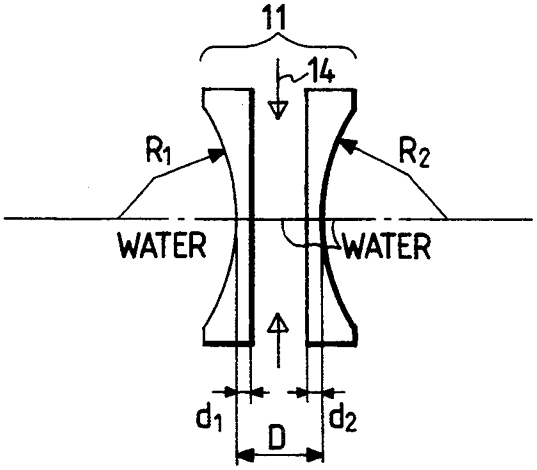
FIGS. 5 through 7 are sectional views illustrating other examples of the acoustic lens system according to the present invention.
Figure 6:
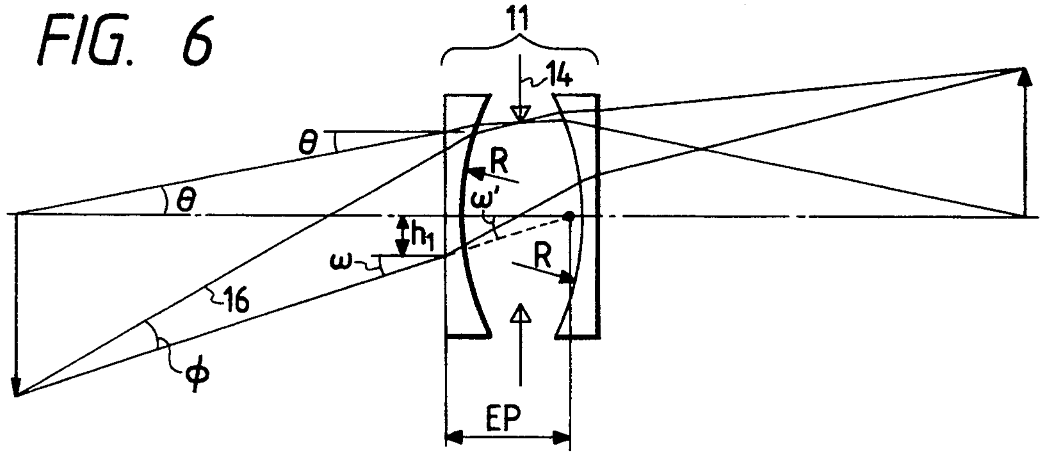
Figure 7:
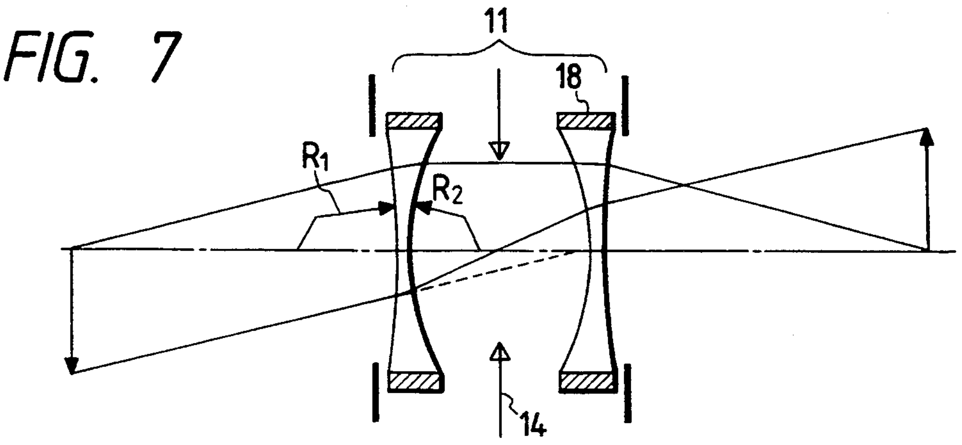
Figure 8:
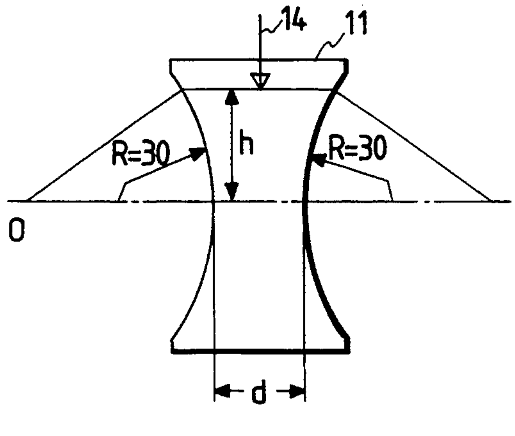
FIGS. 8 and 9 are sectional views illustrating models of acoustic lens systems which consist of a single lens element and a plural number of lens elements, respectively.
Figure 9:
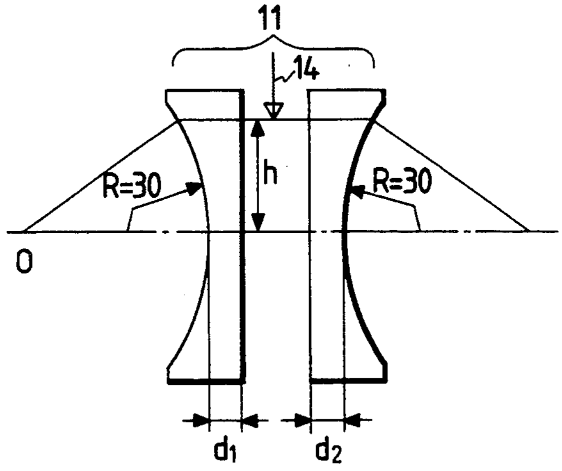
Figure 10:
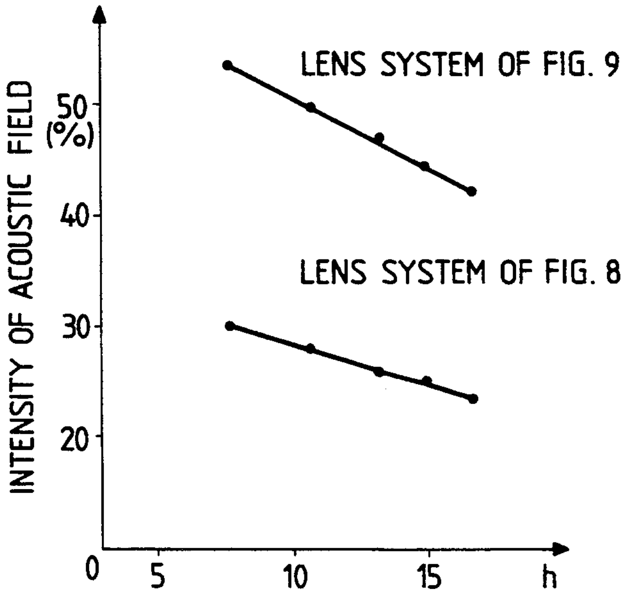
FIG. 10 shows graphs visualizing intensities of acoustic rays which have passed through the models shown in FIGS. 8 and 9, respectively.
Figure 11A:
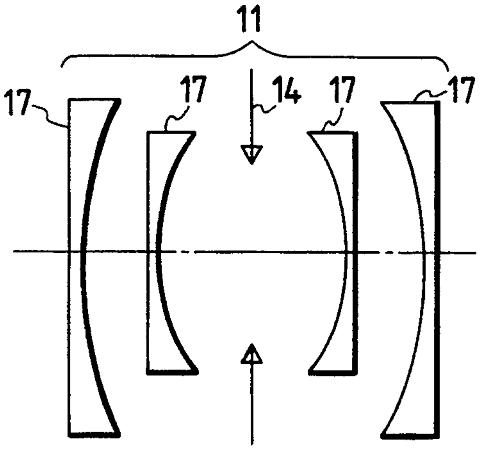
FIGS. 11A and 11B are sectional views illustrating other examples of the acoustic lens system according to the present invention.
Figure 11B:
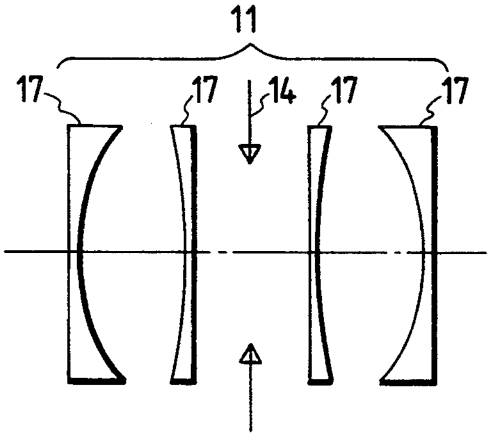
Figure 12:
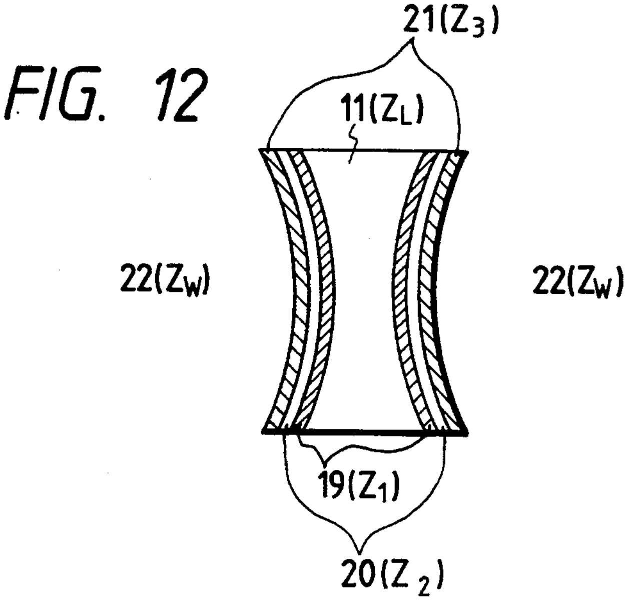
FIG. 12 is a sectional view illustrating an example of acoustic lens system having lens surfaces coated with antireflection films.
Figure 13:
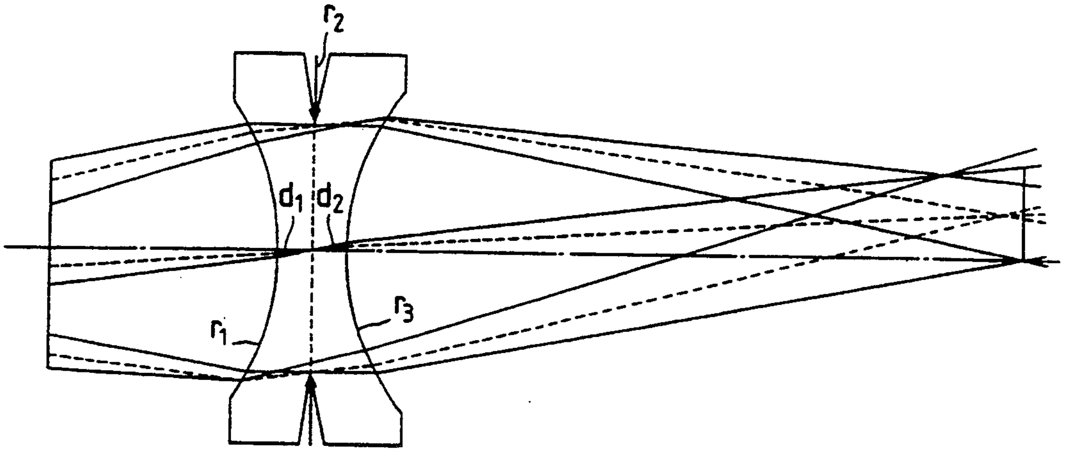
Figure 14A:
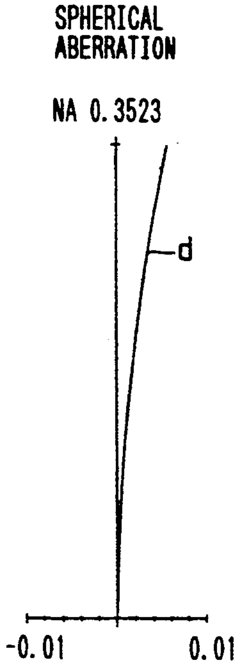
Figure 14B:
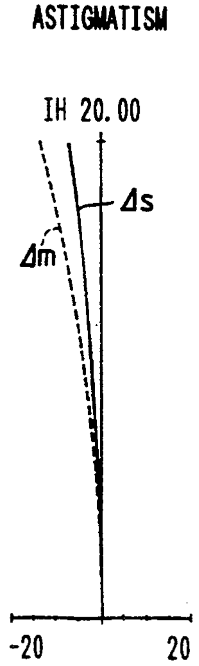
Figure 14C:
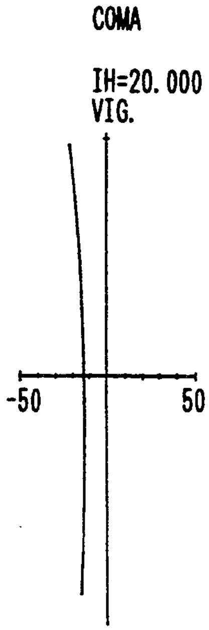

Composition and aberration characteristics of the Embodiment 1 of the present invention are illustrated in FIGS. 13 and 14 respectively.

The acoustic lens system preferred as the Embodiment 1 is the most basical type which consists of a single lens element and has aspherical surfaces of both the side thereof. Especially for correcting the paraxial aberrations, the aspherical surfaces are designed as portions of a spheroid symmetrical with regard to the major axis thereof. Further, formed in the outer circumference at the lens center is a groove for setting an acoustic beam stop. The lens element is made of polystyrene.

| | | |
|---|---|---|
| $r_1 = -49.5606$ (Aspherical surface) | | |
| | $d_1 = 7.7492$ | $n_1 = 0.6696$ |
| $r_2 = \infty$ (stop) | | |
| | $d_2 = 7.7492$ | $n_2 = 0.6696$ |
| $r_3 = 49.5606$ (Ashperical surface) | | |
| First surface $P = 0.5515$, $B_2, E_4, \ldots = 0$ | | |
| Third surface $P = 0.5515$, $B_2, E_4, \ldots = 0$ | | |
| $l_1 = -150$, | $l_2 = 150$, | |
| $IH = 20$, | $f = 81.27$, | |
| $P_s = 0.1079$, | $NA = 0.3523$ | |

Embodiment 2

Figure 15:
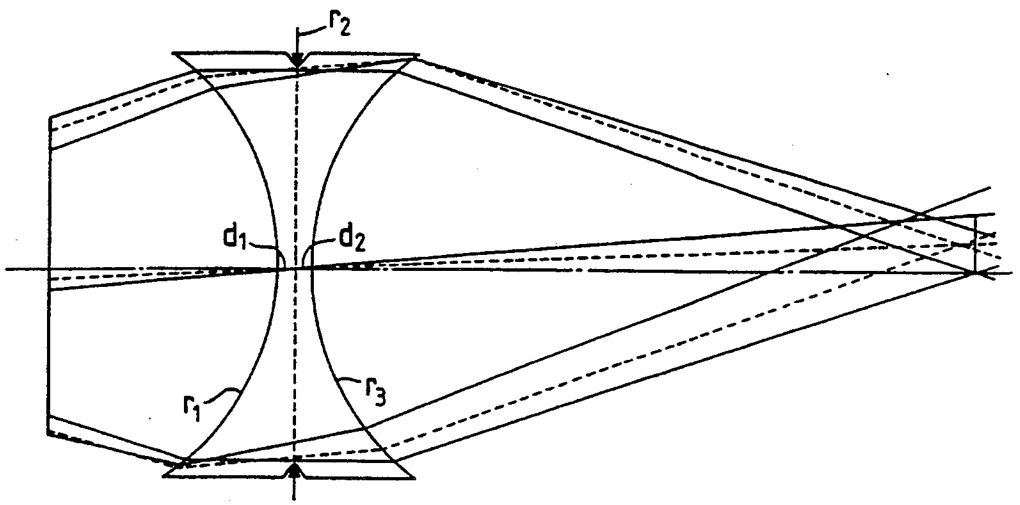
Figures 16A, 16B, 16C:
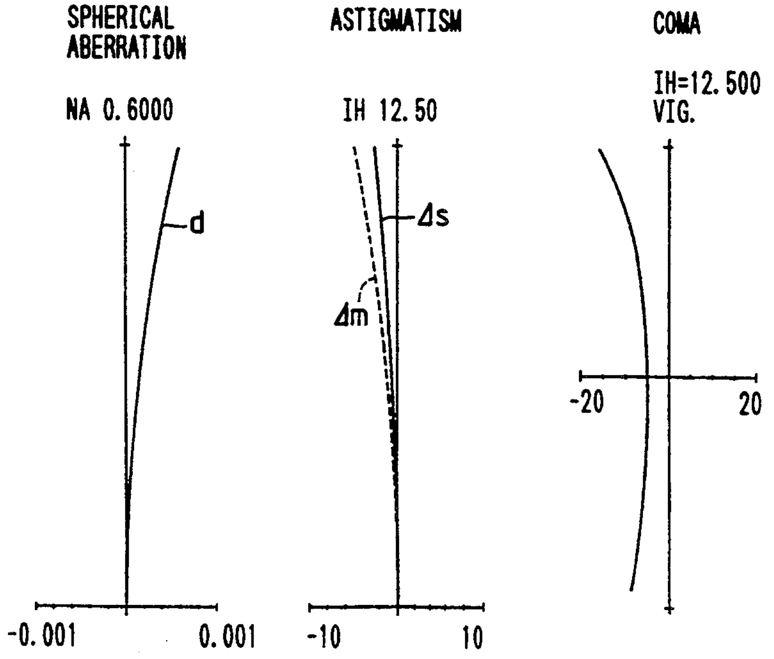

Composition and aberration characteristics of the Embodiment 2 of the present invention are illustrated in FIGS. 15 and 16 respectively.

In the Embodiment 2 which has the composition fundamentally similar to that of the Embodiment 1 acoustic rays are allows to pass to a level of NA=0.6 and the paraxial aberrations are nearly zeroed. Polystyrene is selected as a lens medium.

| | | |
|---|---|---|
| $r_1 = -49.5606$ (Aspherical surface) | | |
| | $d_1 = 3.7529$ | $n_1 = 0.6696$ |
| $r_2 = \infty$ (stop) | | |
| | $d_2 = 3.7529$ | $n_2 = 0.6696$ |
| $r_3 = 49.5606$ (Ashperical surface) | | |
| First surface $P = 0.5516$, $B_2, E_4, \ldots = 0$ | | |
| Third surface $P = 0.5516$, $B_2, E_4, \ldots = 0$ | | |
| $l_1 = -150$, | $l_2 = 150$, | |
| $IH = 12.5$, | $f = 77.91$, | |
| $P_s = 0.1032$, | $NA = 0.6$ | |

Embodiment 3

Figure 17:
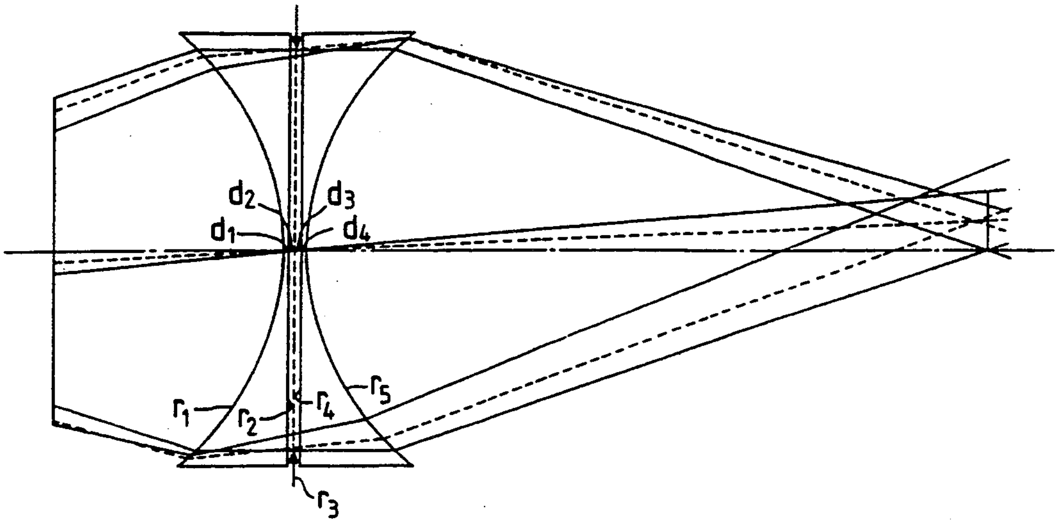
Figure 18A:
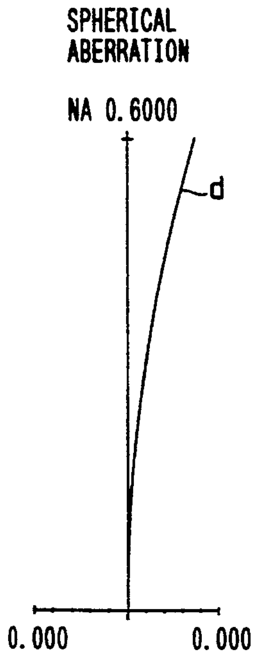
Figure 18B:
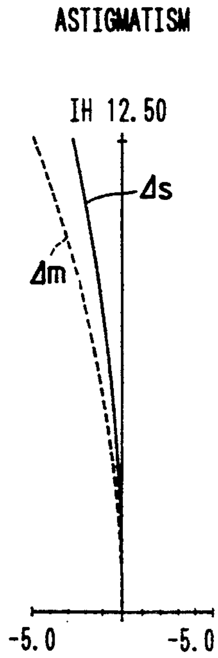
Figure 18C:
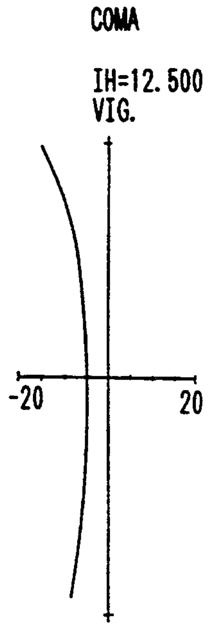

Composition and aberration characteristics of the Embodiment 3 are visualized in FIGS. 17 and 18 respectively.

In order to reduce attenuation due to lens medium as compared with that in the Embodiment 2, the Embodiment 3 is composed of two lens elements to reduce thickness of the lens system and water is filed between the two lens elements.

| | | |
|---|---|---|
| $r_1 = -49.5606$ (Aspherical surface) | | |
| | $d_1 = 1.0000$ | $n_1 = 0.6696$ |
| $r_2 =$ (stop) | | |
| | $d_2 = 1.4098$ | |
| $r_3 = \infty$ (stop) | | |
| | $d_3 = 1.4098$ | |
| $r_4 = \infty$ | | |
| | $d_4 = 1.0000$ | $n_2 = 0.6696$ |
| $r_5 = 49.5606$ (Aspherical surface) | | |
| First surface $P = 0.5516$, $B_2, E_4, \ldots = 0$ | | |
| Fifth surface $P = 0.5516$, $B_2, E_4, \ldots = 0$ | | |
| $l_1 = -150$, | $l_2 = 150$, | |
| $IH = 12.5$, | $f = 76.48$, | |
| $P_s = 0.102$, | $NA = 0.6$ | |

Embodiment 4

Composition and aberration characteristics of the Embodiment 4 are illustrated in FIGS. 19 and 20 respectively.

The Embodiment 4 is composed of two lens elements having surfaces which are concave toward the acoustic beam stop, have powers respectively and are designed as aspherical surfaces.

| | | |
|---|---|---|
| $r_1 = \infty$ | | |
| | $d_1 = 1.0000$ | $n_1 = 0.6696$ |
| $r_2 = 50.0540$ (Aspherical surface) | | |
| | $d_2 = 35.6063$ | |
| $r_3 = \infty$ (stop) | | |
| | $d_3 = 35.6063$ | |
| $r_4 = -50.0540$ (Aspherical surface) | | |
| | $d_4 = 1.0000$ | $n_2 = 0.6696$ |
| Second surface | $P = 1.0000$, $B_2 = 0$, | |
| | $E_4 = -0.19761 \times 10^{-5}$, | |
| | $F_6 = -0.15835 \times 10^{-10}$, | |
| | $G_8 = -0.21668 \times 10^{-12}$, | |
| | $H_{10}, I_{12}, \ldots = 0$ | |
| Fourth surface | $P = 1.0000$, $B_2 = 0$ | |
| | $E_4 = -0.19761 \times 10^{-5}$, | |
| | $F_6 = -0.15835 \times 10^{-10}$, | |
| | $G_8 = -0.21668 \times 10^{-12}$, | |
| | $H_{10}, I_{12}, \ldots = 0$ | |
| $l_1 = -150$, | $l_2 = 150$, | |
| $IH = 30$, | $f = 99.02$, | |
| $P_s = 0.13$, | $NA = 0.3$ | |

Embodiment 5

Composition and aberration characteristics of the Embodiment 5 are visualized in FIGS. 21 and 22 respectively.

The Embodiment 5 has the composition which is fundamentally similar to that of the Embodiment 4, but is so designed as to allow acoustic rays to pass to a level of NA=0.6 and correct especially the paraxial aberrations with the aspherical surfaces. The aspherical surfaces are designed as hyperboloids.

| | | |
|---|---|---|
| $r_1 = \infty$ | | |
| | $d_1 = 1.0000$ | $n_1 = 0.6696$ |
| $r_2 = 50.0540$ (Aspherical surface) | | |
| | $d_2 = 62.4276$ | |
| $r_3 = \infty$ (stop) | | |
| | $d_3 = 62.4276$ | |
| $r_4 = 50.0540$ (Aspherical surface) | | |
| | $d_4 = 1.0000$ | $n_2 = 0.6696$ |
| $r_5 = \infty$ | | |
| Second surface $P = -1.1465$, $B_2, E_4, \ldots = 0$ | | |
| Fourth surface $P = -1.1465$, $B_2, E_4, \ldots = 0$ | | |
| $l_1 = -150$ | $l_2 = 150$, | |
| $IH = 20$, | $f = 128.84$, | |
| $P_s = 0.169$, | $NA = 0.6$ | |

Embodiment 6

Figure 23:
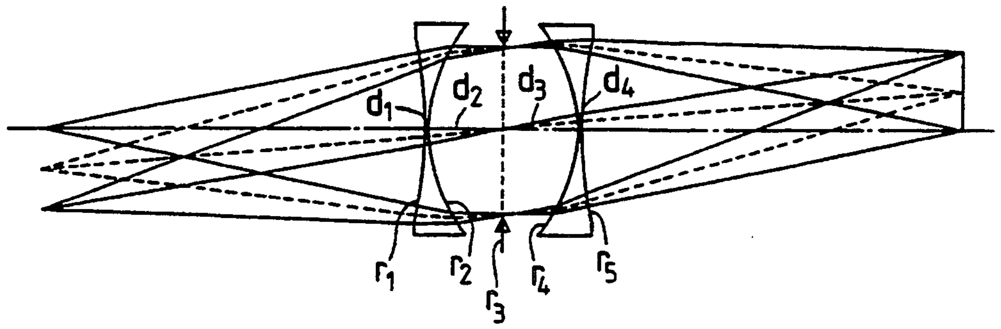
Figure 24A:
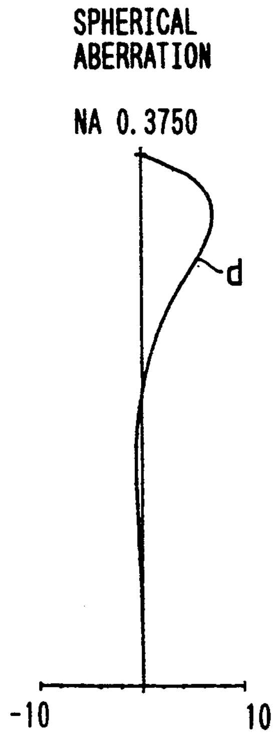
Figure 24B:
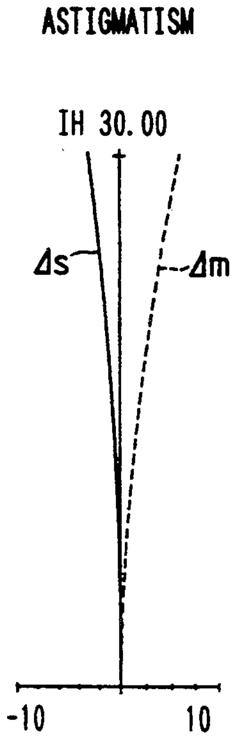
Figure 24C:
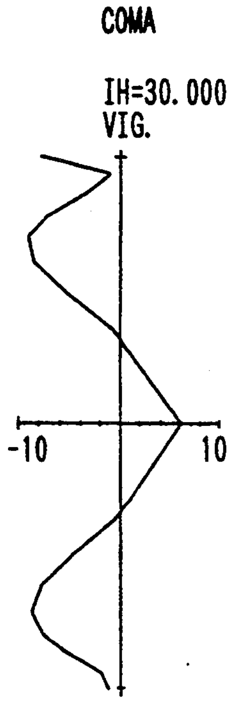

Composition and aberration characteristics of the Embodiment 6 are illustrated in FIGS. 23 and 24 respectively.

In the Embodiment 6 which has the composition fundamentally similar to that of the Embodiment 5, the surfaces corresponding to the plane surfaces in the Embodiment 5 are slightly curved.

| | | |
|---|---|---|
| $r_1 = -210.6938$ (Aspherical surface) | | |
| | $d_1 = 1.0000$ | $n_1 = 0.762$ |
| $r_2 = 43.2951$ (Aspherical surface) | | |
| | $d_2 = 29.7350$ | |
| $r_3 = \infty$ (stop) | | |
| | $d_3 = 29.7350$ | |
| $r_4 = -43.2951$ (Aspherical surface) | | |
| | $d_4 = 1.0000$ | $n_2 = 0.762$ |
| $r_5 = 210.6938$ (Ashperical surface) | | |
| First surface | $P = 1.0000$, $B_2 = 0$, | |
| | $E_4 = -0.10332 \times 10^{-5}$, | |
| | $F_6 = -0.14884 \times 10^{-8}$, | |
| | $G_8 = -0.12663 \times 10^{-11}$, | |
| | $H_{10}, I_{12}, \ldots = 0$ | |

-continued

Second surface $P = 1.0000, B_2 = 0$
$E_4 = -0.34938 \times 10^{-5}$,
$F_6 = -0.12802 \times 10^{-8}$,
$G_8 = -0.66805 \times 10^{-12}$,
$H_{10}, I_{12}, \ldots = 0$ Fourth surface $P = 1.0000, B_2 = 0$
$E_4 = 0.34938 \times 10^{-5}$,
$F_6 = -0.12802 \times 10^{-8}$,
$G_8 = -0.66805 \times 10^{-12}$,
$H_{10}, I_{12}, \ldots = 0$ Fifth surface $P = 1.0000, B_2 = 0$
$E_4 = 0.10332 \times 10^{-5}$,
$F_6 = 0.14884 \times 10^{-8}$,
$G_8 = -0.12663 \times 10^{-11}$,
$H_{10}, I_{12}, \ldots = 0$ $l_1 = -150$, $l_2 = 150$,
$IH = 30$, $f = 94.23$,
$P_s = 0.1092$, $NA = 0.375$

Embodiment 7

Composition and aberration characteristics of the Embodiment 7 are illustrated in FIGS. 25 and 26 respectively.

The Embodiment 7 has the composition which is fundamentally similar to that of the Embodiment 6, but uses TPX004 as a lens medium.

$r_1 = -214.8905$ (Aspherical surface)
$d_1 = 1.0000$ $n_1 = 0.762$
$r_2 = 43.1245$ (Aspherical surface)
$d_2 = 30.6147$
$r_3 = \infty$ (stop)
$d_3 = 30.6147$
$r_4 = -43.1245$ (Aspherical surface)
$d_4 = 1.0000$ $n_2 = 0.762$
$r_5 = 214.8905$ (Aspherical surface)

First surface $P = 1.0000, B_2 = 0$,
$E_4 = -0.14141 \times 10^{-5}$,
$F_6 = -0.84857 \times 10^{-9}$,
$G_8 = 0.17072 \times 10^{-11}$,
$H_{10}, I_{12}, \ldots = 0$ Second surface $P = 1.0000, B_2 = 0$
$E_4 = -0.36820 \times 10^{-5}$,
$F_6 = -0.14204 \times 10^{-8}$,
$G_8 = -0.16844 \times 10^{-11}$,
$H_{10}, I_{12}, \ldots = 0$ Fourth surface $P = 1.0000, B_2 = 0$
$E_4 = 0.36820 \times 10^{-5}$,
$F_6 = 0.14204 \times 10^{-8}$,
$G_8 = -0.16844 \times 10^{-11}$,
$H_{10}, I_{12}, \ldots = 0$ Fifth surface $P = 1.0000, B_2 = 0$
$E_4 = 0.14141 \times 10^{-5}$,
$F_6 = 0.84857 \times 10^{-9}$,
$G_8 = -0.17072 \times 10^{-11}$,
$H_{10}, I_{12}, \ldots = 0$ $l_1 = -150$, $l_2 = 150$,
$IH = 30$, $f = 94.917$,
$P_s = 0.11$, $NA = 0.3$,

Embodiment 8

Composition and aberration characterisitics of the Embodiment 8 are visualized in FIGS. 27 and 28 respectively.

In the Embodiment 8, the surfaces concave toward the acoustic beam stop have shapes which are asymmetrical with regard to the acoustic beam stop, and stray acoustic beam stops are arranged before and after the lens system. The stray acoustic stops are made, for example, of silicone rubber having excel lent acoustic absorption characteristic.

$r_1 =$ (Stray acoustic beam stop)
$d_1 = 5.0000$
$r_2 = -136.0629$ (Aspherical surface)
$d_2 = 12.9965$ $n_1 = 0.6696$
$r3 = 176.3437$
$d_3 = 33.5424$
$r4 = \infty$ (Acoustic beam stop)
$d_4 = 23.0486$
$r_5 = -77.0553$
$d_5 = 12.9977$ $n_2 = 0.6696$
$r_6 = 287.8483$ (Aspherical surface)
$d_6 = 10.0000$
$r_7 = \infty$ (Stray acoustic beam stop)

Second surface $P = 1.0000, B_2 = 0$,
$E_4\ 0.84461 \times 10^{-6}$,
$F_6 = 0.94866 \times 10^{-12}$,
$G_8, H_{10}, I_{12}, \ldots = 0$ Sixth surface $P = 1.0000, B_2 = 0$
$E_4 = -0.18899 \times 10^{-6}$,
$F_6 = -0.31700 \times 10^{-10}$,
$G_8, H_{10}, I_{12}, \ldots = 0$ $l_1 = -190$, $l_2 = 188.259$,
$IH = 64$, $f = 126.03$,
$P_s = 0.122$, $NA = 0.2676$

Embodiment 9

Composition and aberration characterisitics of the Embodiment 9 are illustrated in FIGS. 29 and 30 respectively.

The Embodiment 9 is composed of four lens elements so as to further reduce total thickness of the acoustic lens system.

$rl = \infty$ (Stray acoustic beam stop)
$d_1 = 1.0000$ $n_1 = 0.6696$
$r_2 = 95.0930$ (Aspherical surface)
$d_2 = 28.4910$
$r_3 = \infty$
$d_3 = 1.0000$ $n_2 = 0.762$
$r_4 = 94.6677$ (Aspherical surface)
$d_4 = 37.5238$
$r_5 = \infty$ (Acoustic beam stop)
$d_5 = 37.5238$
$r_6 = -94.6677$ (Aspherical surface)
$d_6 = 1.0000$ $n_3 = 0.762$
$r_7 = \infty$
$d_7 = 28.4910$
$r_8 = -95.0930$ (Aspherical surface)
$d_8 = 1.0000$ $n_8 = 0.6696$
$r_9 = \infty$ (Stray acoustic beam stop)

Second surface $P = 1.0000, B_2, E_4, \ldots = 0$,

Fourth surface $P = 1.0000, B_2 = 0$,
$E_4 = -0.58491 \times 10^{-6}$,
$F_6 = 0.24789 \times 10^{-9}$,
$G_8 = 0.32596 \times 10^{-13}$,
$H_{10}, H_{12}, \ldots = 0$, Sixth surface $P = 1.0000, B_2 = 0$
$E_4 = 0.58491 \times 10^{-6}$,
$F_6 = 0.24789 \times 10^{-9}$,
$G_8 = -0.32596 \times 10^{-13}$,
$H_{10}, I_{12}, \ldots = 0$, Eighth surface $P = 1.0000, B_2, E_4, \ldots = 0$, $l_1 = -160$, $l_2 = 160$,
$IH = 64$, $f = 126.08$,
$P_3 = 0.145$, $NA = 0.3428$

Embodiment 10

Composition and aberration characterisitcs of the Embodiment 10 are visualized in FIGS. 31 and 32 respectively.

In the Embodiment 10, the lens system is composed of four lens elements which are arranged asymmetrically with regard to the acoustic beam stop.

| | | |
|---|---|---|
| $r_1$ = = (Stray acoustic beam stop) | | |
| | $d_1$ = 1.0000 | $n_1$ = 0.6696 |
| $r_2$ = 78.2721 (Aspherical surface) | | |
| | $d_2$ = 27.9934 | |
| $r_3$ = −272.1705 | | |
| | $d_3$ = 1.0000 | $n_2$ = 0.6696 |
| $r_4 = \infty$ | | |
| | $d_4$ = 31.7784 | |
| $r_5$ = (Acoustic beam stop) | | |
| | $d_5$ = 32.1822 | |
| $r_6 = \infty$ | | |
| | $d_6$ = 1.0000 | $n_3$ = 0.6696 |
| $r_7$ = 83.9282 | | |
| | $d_7$ = 43.0056 | |
| $r_8$ = −122.5614 (Aspherical surface) | | |
| | $d_8$ = 1.0000 | $n_8$ = 0.6696 |
| $r_9 = \infty$ (Stray acoustic beam stop) | | |
| Second surface | $P = 1.000, B_2, \ldots = 0,$ $E_4 = -0.50262 \times 10^{-6},$ $F_6, G_8, \ldots = 0,$ | |
| Eighth surface | $P = 1.0000, B_2 = 0$ $E_4 = 0.10253 \times 10^{-5},$ $F_6, G_8, \ldots = 0,$ | |
| $l_1 = -160,$ | $l_2 = 151.05,$ | |
| IH = 64, | f = 126, | |
| $P_s = 0.1512,$ | NA = 0.3493 | |

What is claimed is:

1. An acoustic lens system for imaging sound waves generated from a sound source, comprising:
   - a plurality of acoustic lens elements constructed of solid materials and having an entrance surface and an exit surface with centers of curvature located at different positions,
   - there being spaces between said plurality of acoustic lens elements which spaces are filled with a medium having an attenuation factor of a sound wave which is smaller than that of a lens medium,
   - wherein said acoustic lens system has an acoustic beam stop therein and a foremost lens, among said plurality of lens elements, is configured so that curvature of a surface located on an exit side thereof is larger than that of a surface located on an entrance side, while a rearmost lens is configured so that curvature of a surface located on the exit side thereof is smaller than that of a surface located on the entrance side.

2. An acoustic lens system for imaging sound waves generated from a sound source, comprising:
   - a plurality of acoustic lens elements constructed of solid materials and having an entrance surface and an exit surface with centers of curvature located at different positions,
   - there being spaces between said plurality of acoustic lens elements which spaces are filled with a medium having an attenuation factor of a sound wave which is smaller than that of a lens medium,
   - wherein said acoustic lens system has an acoustic beam stop therein and a foremost lens, among said plurality of lens elements, is configured so that curvature of a surface located on an exit side thereof is larger than that of a surface located on an entrance side, while a rearmost lens is configured so that curvature of a surface located on the exit side thereof is smaller than that of a surface located on the entrance side, and
   - wherein said plurality of acoustic lens elements satisfies the condition:

$$\omega > \sin^{-1}(v_0/v_1)$$

where $\omega$ is a half field angle of the acoustic lens system, $v_0$ is the velocity of sound in a medium located on an entrance side of a first surface of the lens system, and $v_1$ is the velocity of sound in a medium located on an exit side of the first surface.

3. An acoustic lens system according to claim 1 or 3, wherein each of surfaces in which said curvature is smaller is a plane surface.

4. An acoustic lens system for imaging sound waves generated from a sound source, comprising:
   - a plurality of acoustic lens elements constructed of solid materials and having an entrance surface and an exit surface with centers of curvature located at different positions,
   - there being spaces between said plurality of acoustic lens elements which spaces are filled with a medium having an attenuation factor of a sound wave which is smaller than that of a lens medium,
   - wherein said acoustic lens systems has an acoustic beam stop therein and a foremost lens, among said plurality of lens elements, is configured so that curvature of a surface located on an exit side thereof is smaller than that of a surface located on an entrance side, while a rearmost lens is configured so that curvature of a surface located on the exit side thereof is larger than that of a surface located on the entrance side.

5. An acoustic lens system for imaging sound waves generated from a sound source, comprising:
   - a plurality of acoustic lens elements constructed of solid materials and having an entrance surfaces and an exit surface with centers of curvature located at different positions,
   - there being spaces between said plurality of acoustic lens elements which spaces are filled with a medium having an attenuation factor of a sound wave which is smaller than that of a lens medium,
   - wherein said acoustic lens system has an acoustic beam stop therein and a foremost lens, among said plurality of lens elements, is configured so that curvature of a surface located on an exit side thereof is smaller than that of a surface located on an entrance side, while a rearmost lens is configured so that curvature of a surface located on the exit side thereof is larger than that of a surface located on the entrance side, and
   - wherein said plurality of acoustic lens elements satisfies the condition:

$$\omega < \sin^{-1}(v_0/v_1)$$

where $\omega$ is a half field angle of the acoustic lens system, $v_0$ is the velocity of sound in a medium located on an entrance side of a first surface of the lens system, and $v_1$ is the velocity of sound in a medium located on an exit side of the first surface.

6. An acoustic lens system according to claim 4 or 5, wherein each of surfaces in which said curvature is smaller is a plane surface.

7. An acoustic lens system for imaging sound waves generated from a sound source, comprising:
   - at least one acoustic lens element constructed of a solid material and having entrance and exit surfaces whose centers of curvature are located at different positions,
   - wherein individual lens surfaces of said acoustic lens element are coated with antireflection films made of substances different in acoustic impedance from a lens medium and wherein said acoustic lens element satisfies the condition:

$$\omega<\sin^{-1}(v_0/v_1)$$

where ω is a half field angle of the acoustic lens system, $v_0$ is the velocity of sound in a medium located on an entrance side of a first surface of the lens system, and $v_1$ is the velocity of sound in a medium located on an exit side of the first surface.

8. An acoustic lens system for imaging sound waves generated from a sound source, comprising:

at least one acoustic lens element constructed of a solid material and having entrance and exit surfaces whose centers of curvature are located at different positions, wherein said acoustic lens element satisfies the condition:

$$\omega<\sin^{-1}(v_0/v_1)$$

and is provided with aspherical surfaces expressed by $$x=\frac{\frac{y^2}{R}}{1+\sqrt{1-P\frac{y^2}{R^2}}}+B2y^2+E4y^4+\ldots$$

where ω is a half field angle of the acoustic lens system, $v_0$ is the velocity of sound in a medium located on an entrance side of a first surface of the lens system, $v_1$ is the velocity of sound in a medium located on an exit side of the first surface, x is the axis of the lens system (the straight line passing through the centers of curvature of respective surfaces), y is the straight line perpendicular to the axis of the lens system, R is the radius of curvature of the surface at an origin which is the intersection between the x axis and the surface, P is the coefficient of cone, and B2, E4, . . . are aspherical surface coefficients of the second order, the four order, . . .

9. An acoustic lens system for imaging sound waves generated from a sound source, comprising:

at least one acoustic lens element constructed of a solid material and having entrance and exit surfaces whose centers of curvature are located at different positions; and at least one acoustic beam stop made of an acoustic absorbing material and having an aperture diameter smaller than an outer diameter of said acoustic lens element, wherein two pairs of acoustic lens elements each having concave surfaces directed toward each other are disposed before and behind said acoustic beam stop, respectively, and satisfy the condition:

$$\omega<\sin^{-1}(v_0/v_1)$$

where ω is a half field angle of the acoustic lens system, v0 is the velocity of sound in a medium located on an entrance side of a first surface of the lens system, and v1 is the velocity of sound in a medium located on an exit side of the first surface.

10. An acoustic lens system for imaging sound waves generated from a sound source, comprising:

at least one acoustic lens element constructed of a solid material and having entrance and exit surfaces whose centers of curvature are located at different positions; and at least one acoustic beam stop made of an acoustic absorbing material and having an aperture diameter smaller than an outer diameter of said acoustic lens element, wherein two sets of plural acoustic lens elements each having concave surfaces directed toward said acoustic beam stop are disposed before and behind said acoustic beam stop, respectively, and satisfy the condition:

$$\omega<\sin^{-1}(v_0/v_1)$$

where ω is a half field angle of the acoustic lens system v0 is the velocity of sound in a medium located on an entrance side of a first surface of the lens system, and V1 is the velocity of sound in a medium located on an exit side of the first surface.

11. An acoustic lens system for imaging sound waves generated from a sound source, comprising:

a plurality of acoustic lens elements constructed of solid materials and having an entrance surface and an exit surface with centers of curvature located at different positions, there being spaces between said plurality of acoustic lens elements which spaces are filled with a medium having an attenuation factor of a sound wave which is smaller than that of a lens medium, wherein individual lens surfaces of said plurality of acoustic lens elements are coated with antireflection films made of substances different in acoustic impedance from the lens medium.

12. An acoustic lens system for imaging sound waves generated from a sound source, comprising:

a plurality of acoustic lens elements constructed of solid materials and having an entrance surface and an exit surface with centers of curvature located at different positions, there being spaces between said plurality of acoustic lens elements which spaces are filled with a medium having an attenuation factor of a sound wave which is smaller than that of a lens medium, wherein individual lens surfaces of said plurality of acoustic lens elements are coated with antireflection films made of substances different in acoustic impedance from the lens medium, and wherein said plurality of acoustic lens elements satisfies the condition:

$$\omega<\sin^{-1}(v_0/v_1)$$

where ω is a half field angle of the acoustic lens system, $v_0$ is the velocity of sound in a medium located on an entrance side of a first surface of the lens system, and $v_1$ is the velocity of sound in a medium located on an exit side of the first surface.

13. An acoustic lens system for imaging sound waves generated from a sound source, comprising:

a plurality of acoustic lens elements constructed of solid materials and having an entrance surface and an exit surface with centers of curvature located at different positions, there being spaces between said plurality of acoustic lens elements which spaces are filled with a medium having an attenuation factor of a sound wave which is smaller than that of a lens medium; and at least one acoustic beam stop made of an acoustic absorbing material and having an aperture diameter smaller than an outer diameter of each of said plurality of acoustic lens elements, wherein two pairs of acoustic lens elements each having concave surfaces directed toward each other are disposed before and behind said acoustic beam stop, respectively.

14. An acoustic lens system for imaging sound waves generated from a sound source, comprising:

a plurality of acoustic lens elements constructed of solid materials and having an entrance surface and an exit surface with centers of curvature located at different positions, there being spaces between said plurality of acoustic lens elements which spaces are filled with a medium having an attenuation factor of a sound wave which is smaller than that of a lens medium; and at least one acoustic beam stop made of an acoustic absorbing material and having an aperture diameter smaller than an outer diameter of each of said plurality of acoustic lens elements, wherein two pairs of acoustic lens elements each having concave surfaces directed toward each other are disposed before and behind said acoustic beam stop, respectively, and wherein said plurality of acoustic lens elements satisfy the condition:

$$\omega<\sin^{-1}(v_0/v_1)$$

where $\omega$ is a half field angle of the acoustic lens system, $v_0$ is the velocity of sound in a medium located on an entrance side of a first surface of the lens system, and $v_1$ is the velocity of sound in a medium located on an exit side of the first surface.

15. An acoustic lens system for imaging sound waves generated from a sound source, comprising:

a plurality of acoustic lens elements constructed of solid materials and having an entrance surface and an exit surface with centers of curvature located at different positions, there being spaces between said plurality of acoustic lens elements which spaces are filled with a medium having an attenuation factor of a sound wave which is smaller than that of a lens medium; and at least one acoustic beam stop made of an acoustic absorbing material and having an aperture diameter smaller than an outer diameter of each of said plurality of acoustic lens elements, wherein two sets of plural acoustic lens elements each having concave surfaces directed toward said acoustic beam stop are disposed before and behind said acoustic beam stop, respectively.

16. An acoustic lens system for imaging sound waves generated from a sound source, comprising:

a plurality of acoustic lens elements constructed of solid materials and having an entrance surface and an exit surface with centers of curvature located at different positions, there being spaces between said plurality of acoustic lens elements which spaces are filled with a medium having an attenuation factor of a sound wave which is smaller than that of a lens medium; and at least one acoustic beam stop made of an acoustic absorbing material and having an aperture diameter smaller than an outer diameter of each of said plurality of acoustic lens elements, wherein two sets of plural acoustic lens elements each having concave surfaces directed toward said acoustic beam stop are disposed before and behind said acoustic beam stop, respectively, and wherein said plurality of acoustic lens elements satisfy the condition:

$$\omega<\sin^{-1}(v_0/v_1)$$

where $\omega$ is a half field angle of the acoustic lens system, $v_0$ is the velocity of sound in a medium located on an entrance side of a first surface of the lens system, and $v_1$ is the velocity of sound in a medium located on an exit side of the first surface.

17. An acoustic lens system for imaging sound waves generated from a sound source, comprising:

a plurality of acoustic lens elements constructed of solid materials and having an entrance surface and an exit surface with centers of curvature located at different positions, there being spaces between said plurality of acoustic lens elements which spaces are filled with a medium having an attenuation factor of a sound wave which is smaller than that of a lens medium, wherein said plurality of acoustic lens elements satisfies the condition:

$$\omega<\sin^{-1}(v_0/v_1)$$

and is provided with aspherical surfaces expressed by $$x=\frac{\frac{y^2}{R}}{1+\sqrt{1-P\frac{y^2}{R^2}}}+B2y^2+E4y^4+\dots$$

where $\omega$ is a half field angle of the acoustic lens system, $v_0$ is the velocity of sound in a medium located on an entrance side of a first surface of the lens system, $v_1$ is the velocity of sound in a medium located on an exit side of the first surface, x is the axis of the lens system (the straight line passing through the centers of curvature of respective surfaces), y is the straight line perpendicular to the axis of the lens system, R is the radius of curvature of the surface at an origin which is the intersection between the x axis and the surface, P is the coefficient of cone, and B2, E4, . . . are aspherical surface coefficients of the second order, the fourth order, . . . .

* * * * *